(12) United States Patent
Nakano (10) Patent No.: US 7,866,044 B2
(45) Date of Patent: Jan. 11, 2011

(54) METHOD OF PRODUCING METAL TUBULAR MEMBER

(75) Inventor: Hidenori Nakano, Miyoshi (JP)

(73) Assignee: Sango Co., Ltd., Nishikamo-Gun, Aichi (JP)

( * ) Notice: Subject to any disclaimer, the term of this patent is extended or adjusted under 35 U.S.C. 154(b) by 1086 days.

(21) Appl. No.: 11/597,352

(22) PCT Filed: May 26, 2005

(86) PCT No.: PCT/JP2005/009670
§ 371 (c)(1),
(2), (4) Date: Nov. 21, 2006

(87) PCT Pub. No.: WO2005/115683
PCT Pub. Date: Dec. 8, 2005

(65) Prior Publication Data
US 2007/0227001 A1 Oct. 4, 2007

(30) Foreign Application Priority Data
May 28, 2004 (JP) .............................. 2004-158657

(51) Int. Cl.
*B21D 39/00* (2006.01)
*B23P 11/02* (2006.01)
*B23P 15/26* (2006.01)
(52) U.S. Cl. .............................. 29/890.043; 29/890.08; 29/515; 29/508; 29/505; 29/451
(58) Field of Classification Search .................. 29/437, 29/450, 451, 505, 508, 515, 516, 521, 709, 29/890.036, 890.043, 890.08
See application file for complete search history.

(56) References Cited

U.S. PATENT DOCUMENTS
2,457,908 A * 1/1949 Meyerhoefer .................. 285/7

(Continued)

FOREIGN PATENT DOCUMENTS
JP 58173033 10/1983

(Continued)

OTHER PUBLICATIONS
PCT International Search Report dated Aug. 9, 2005.

*Primary Examiner*—David P Bryant
*Assistant Examiner*—Alexander P Taousakis
(74) *Attorney, Agent, or Firm*—Dickinson Wright PLLC (57) ABSTRACT

A method of producing a metal tubular member that is composed of two or more tube forming bodies and has at least one portion at which the tube forming bodies are superposed on each other, wherein one open annular end section of one of the tube forming bodies, which one annular end section is positioned on the inner side in the superposed section, and the other open annular end section of the other tube forming body, which the other annular end section is positioned on the outer side, are integrally joined by welding. The one annular end section is inserted into the other annular end section with the outside diameter of the one annular end section pressed by a die so as to be smaller in diameter than the inside diameter of the other annular end section, and then pressing force applied to the one annular end section on the inner side is released to cause it to be in tight contact with the inner surface of the other annular end section on the outer side.

10 Claims, 10 Drawing Sheets

U.S. PATENT DOCUMENTS

| | | | |
|---|---|---|---|
| 4,536,243 A | 8/1985 | Imatani et al. | |
| 5,150,520 A * | 9/1992 | DeRisi | 29/890.043 |
| 5,907,135 A | 5/1999 | Hayakawa et al. | |
| 6,162,404 A | 12/2000 | Tojo et al. | |
| 6,253,792 B1 * | 7/2001 | Williams et al. | 138/39 |
| 2007/0029135 A1 * | 2/2007 | Ermer et al. | 181/269 |

FOREIGN PATENT DOCUMENTS

| | | |
|---|---|---|
| JP | 58173034 | 10/1983 |
| JP | 59192261 | 12/1984 |
| JP | 384850 | 4/1991 |
| JP | 1024381 | 1/1998 |
| JP | 10141052 | 5/1998 |
| JP | 2002 347653 | 12/2002 |

* cited by examiner

METHOD OF PRODUCING METAL TUBULAR MEMBER

TECHNICAL FIELD

The present invention relates to a method of producing a metal tubular member.

BACKGROUND ART

A method in general practice of producing a metal tubular member formed of a thin metal sheet is to pressure-fit into an opening of a tubular body an end plate (lid) for blocking the opening to form superposed sections of the tubular body and the end plate and to integrally join the superposed sections by welding.

In forming such superposed sections, the following method is known as a method of fastening the superposed sections for instance.

Figure 18A:
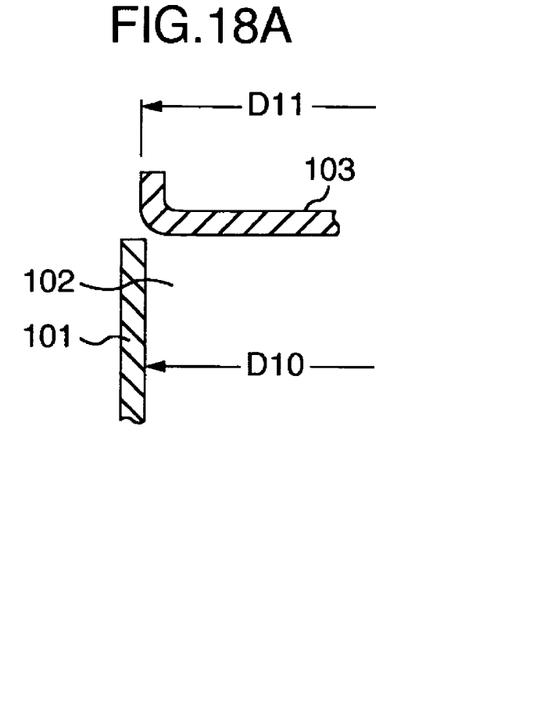
FIG. 18A A diagram showing the first prior art in a state before fitting.
Figure 18B:
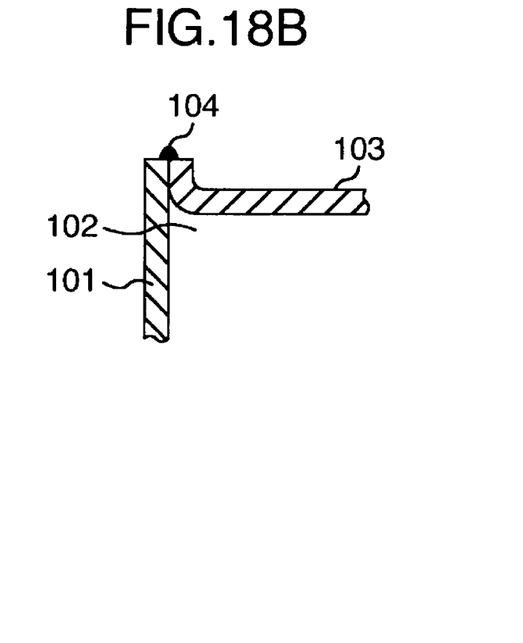
FIG. 18B A diagram showing the first prior art in a fitted state.

There is a method by which, as shown in FIG. 18A, the inside diameter D10 of an opening section 102 of a tubular body 101 is set somewhat smaller than the outside diameter D11 of an end plate 103 and, as shown in FIG. 18B, the end plate 103 is pressure-fitted into the opening section 102 and joined by welding 104 (see Patent Document 1). This will be referred to as the first prior art.

Figure 19:
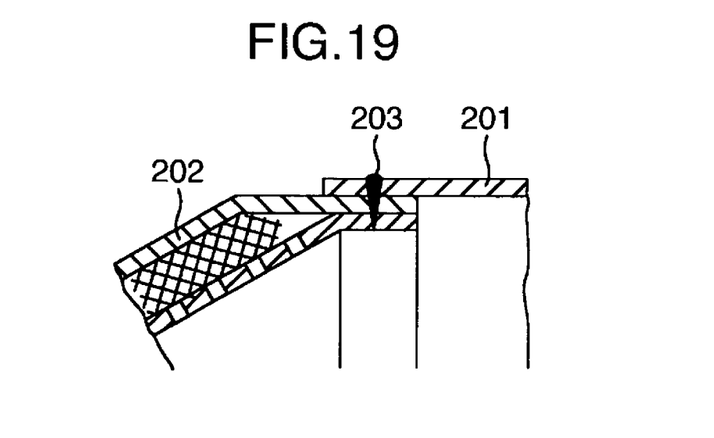
FIG. 19 A sectional view showing the second prior art.

There is another method by which in a muffler for vehicles, as shown in FIG. 19, thin sheet-made end plates 202 are pressure-fitted into both ends of a tubular body 201, the whole circumference of these superposed sections is fixed by laser welding 203 (see Patent Document 2). This will be referred to as the second prior art.

Figure 20A:
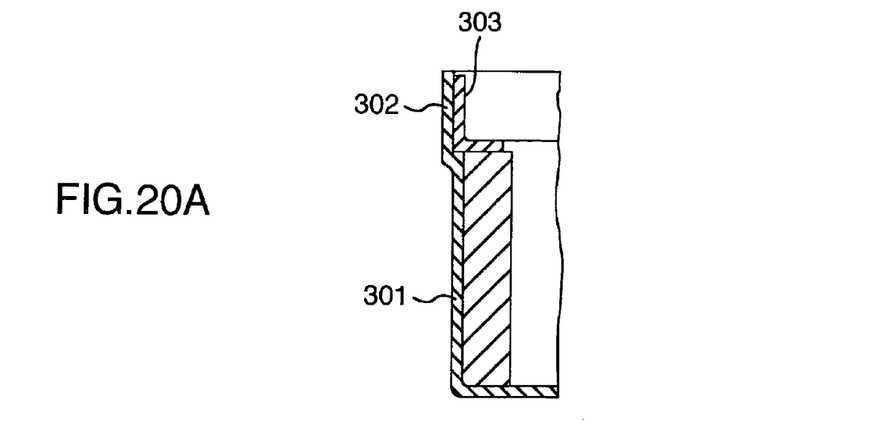
FIG. 20A A sectional view showing a process according to the third prior art.
Figure 20B:
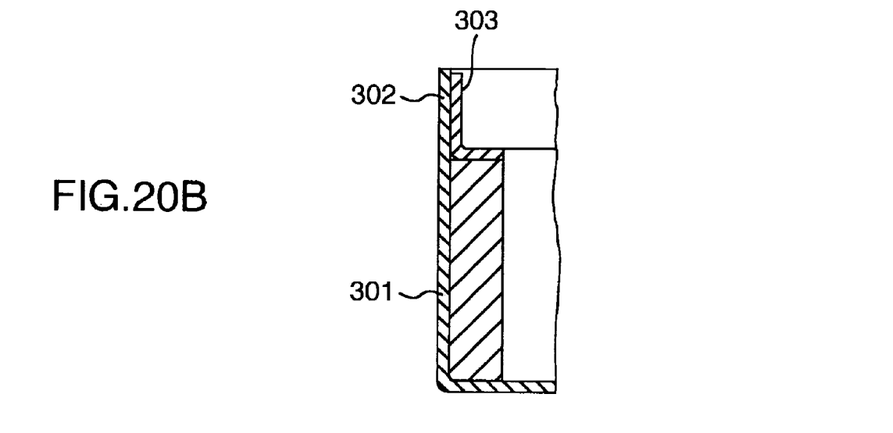
FIG. 20B A sectional view showing the process according to the third prior art.

Further, there is still another method by which, as shown in FIG. 20A, first the inside diameter of an opening section 302 of a tubular body 301 is set greater than the inside diameter of general parts; an end plate (metal ring) 303 is loosely inserted into the opening section 302; then, as shown in FIG. 20B, the opening section 302 of the tubular body 301 is passed through a die under pressure to compress the diameter of the opening section 302 to bring the opening section 302 and the end plate 303 into tight contact; and then the contact sections are subjected to laser welding 304 (see Patent Document 3). This will be referred to as the third prior art.

Patent Document 1: JP-U-59-192661
Patent Document 2: JP-A-10-24381
Patent Document 3: JP-A-3-84850

DISCLOSURE OF THE INVENTION

Problem to be Solved by the Invention

Incidentally, whereas the types of welding applicable between metal sheets as in the foregoing cases include arc welding such as MIG welding and TIG welding, and high energy welding typified by laser welding, where laser welding is used in particular there is a problem that, if the gap in the superposed sections is more than about ⅓ of the sheet thickness, the welding is more susceptible to trouble. For this reason, laser welding requires tight contact of the superposed sections all around the circumference, namely keeping the gap at not more than about ⅓ of the sheet thickness.

For this reason, as methods of achieving tight contact to meet this requirement of the superposed sections for tight contact, the prior arts referred to above are used, but these prior arts involve the following problems.

According to the first prior art illustrated in FIG. 18A and FIG. 18B, if the inside diameter D10 of the opening section 102 and the outside diameter D11 of the end plate 103 of the tubular body 101 in their separated state before pressure fitting fluctuate or the sectional shape of either is uneven, namely if they are sectionally deformed relative to each other, a problem of permitting no pressure fitting, another problem of allowing no uniformly tight contact all around the circumference, or still another problem of slanted pressure fitting of the end plate 103 into the tubular body 101 will arise, which might adversely affect weld quality and working ease.

Or the method of pressure-fitting end plates 202 into both ends of the tubular body 201 in a muffler according to the second prior art illustrated in FIG. 19 involves a problem of significant difficulty of pressure fitting due to the differences in sectional shape and diameter between the two elements, inviting a notably adverse effect on mass productivity, because the tubular body 201 is usually large in diameter (tens of centimeters) but small in sheet thickness (about 1.0 to 2.0 mm).

Figure 20C:
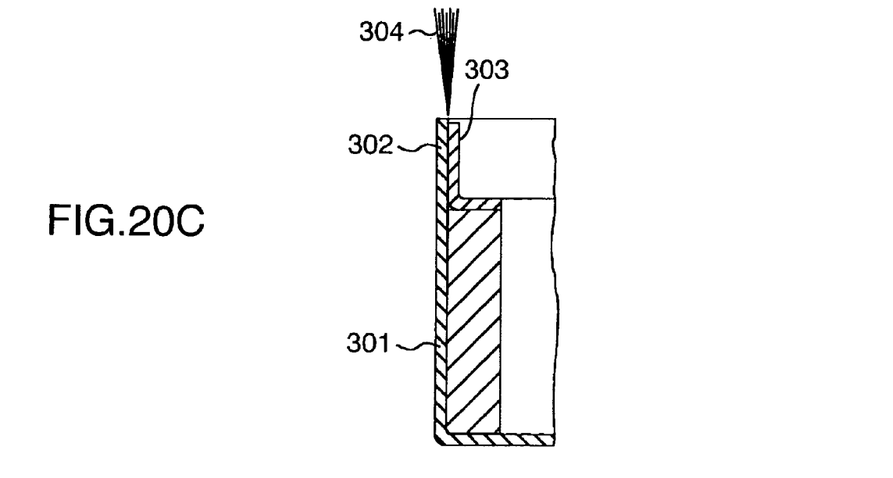
FIG. 20C A sectional view showing the process according to the third prior art.

Or in the method of the third prior art illustrated in FIG. 20A through FIG. 20C, though the opening section 302 of the tubular body 301 and the end plate 303 come into tight contact on the way of passing the die, the diameter of the opening section 302 of the tubular body 301 is expanded by a springing-back action after passing the die, resulting in failure of the two elements to remain in tight contact. Furthermore, this prior art indispensably requires additional machining to draw the opening section 302 after the two elements are fitted together, inviting increases in machining time and cost, which pose a bottleneck in mass production.

Therefore, the present invention is intended to provide a method of producing metal tubular members, representing solutions to these problems.

Means for Solving the Problems

In order to solve the problems noted above, the invention provides a method of producing a metal tubular member by fitting an annular end section of one of tube forming bodies constituting the tubular member into an annular end section of the other tube forming body and welding the superposed sections thereof, characterized in that the annular end section of the inner positioned tube forming body (hereinafter referred to as the inner annular end section) out of those two tube forming bodies is inserted, with the outside diameter thereof made smaller than the annular end section of the outer positioned tube forming body (hereinafter referred to as the outer annular end section), and after that the outside of the inner annular end section is expanded in diameter by springing back to bring the outside face of the inner annular end section into tight contact with the inside face of the outer annular end section.

To achieve this object, according to a first aspect of the invention, a method of producing a metal tubular member, the metal tubular member comprising two or more tube forming bodies and having mutually superposed sections between the tube forming bodies in at least one position, by integrally joining by welding one open annular end section of one tube forming body positioned inside the superposed sections and the other open annular end section of the other tube forming body positioned outside is characterized of comprising the steps of:

inserting the one annular end section, in a state of being so pressurized by a die as to make the outside diameter thereof smaller than the inside diameter of the other annular end section, into the other annular end section, and after that, releasing the one annular end section inside from the pressurizing force, so as to cause the one annular end section inside to be brought by the springing back thereof into tight contact with the inside face of the other annular end section outside.

According to the invention, the springing back of the one annular end section of the one tube forming body fitted inside can bring into tight contact the one annular end section inside with the other annular end section outside, and these superposed sections in tight contact can be easily and securely welded.

In this first aspect, built-in elements may be arranged in at least one tube forming body.

According to a second aspect of the invention, a method of producing a metal tubular member, the metal tubular member comprising two or more tube forming bodies and having mutually superposed sections between the tube forming bodies in at least one position, by integrally joining by welding one open annular end section of one tube forming body positioned inside the superposed sections and the other open annular end section of the other tube forming body positioned outside is characterized in that it includes:

a first step of holding the other tube forming body positioned outside in a holding section, a second step of passing the one annular end section through a tapered section formed in the die which is smaller than the other annular end section in minimum diameter, and loosely inserting the one annular end section into the other annular end section which is held, and a third step of dividing the die to separate it from the other tube forming body which is held and positioned outside.

In the second aspect, the one annular end section of the one tube forming body is corrected by the tapered section of the die in cross-sectional shape and diameter, and made smaller in diameter than the inside diameter of the other annular end section of the other tube forming body to be smoothly inserted into the other annular end section. By dividing and opening the die after that, the one annular end section inside is expanded in diameter by springing back and comes into tight contact with the inside face of the other annular end section.

In this second aspect, a step of arranging built-in elements in at least one tube forming body may be further included.

In the invention, at least one of the tube forming bodies may be made an end plate and at least one, a tubular body.

Also in the invention, two tube forming bodies may be provided as the tube forming bodies and these two tube forming bodies formed in a bowl shape.

Further, in the invention, the difference between the inside diameter of the other annular end section positioned outside and the outside diameter of the one annular end section inside at the time of insertion may be not greater than the extent of springing back which expands the diameter of the one annular end section inside by the separation of the die.

These configurations also enable similar operations and effects to the foregoing to be achieved.

Further, in the second aspect, the die may have the holding section and tapered section adjacent in the penetrating direction of members and coaxially, and be formed to be radially divisible and separable with respect to the axis.

In the foregoing configuration, the coaxial disposition of the one annular end section inside and the other annular end section outside is secured, superposition of the two sections is accomplished satisfactorily, and the members can also be released easily from molds.

Further, in the second aspect, the other annular end section may reach the holding section after passing, on the insertion side thereof, a tapered section disposed integrally with the die and undergoing machining for diametral contraction, and be held by the holding section.

In the foregoing configuration, the other annular end section further undergoes correction in cross-sectional shape and diameter and is held by the die.

Also in the invention, the welding may be accomplished by laser beam welding.

The invention is particularly effective where the superposed sections are welded with a laser beam in this way.

Also in the invention, the metal tubular members may constitute the external shell of a muffler.

Also in the invention, the metal tubular members may constitute the external shell of an exhaust gas purifying device.

Further, in the invention, the metal tubular members may constitute an instrument panel reinforcement for use in motor vehicles.

In these applications, too, similar operations and effects to the foregoing can be achieved in the production of these members.

Effects of the Invention

According to the invention, by actively utilizing the springing back of the one inner annular end section itself, the superposed sections of the one inner annular end section and the other outer annular end section can be easily and securely brought into tight contact even if there are fluctuations in dimension or shape in their separated state, resulting in improved weldability of those sections.

BEST MODES FOR CARRYING OUT THE INVENTION

The best modes for carrying out the present invention will be described below on the basis of embodiments shown in FIGS. 1 through 17.

Embodiment 1

Figure 1A:
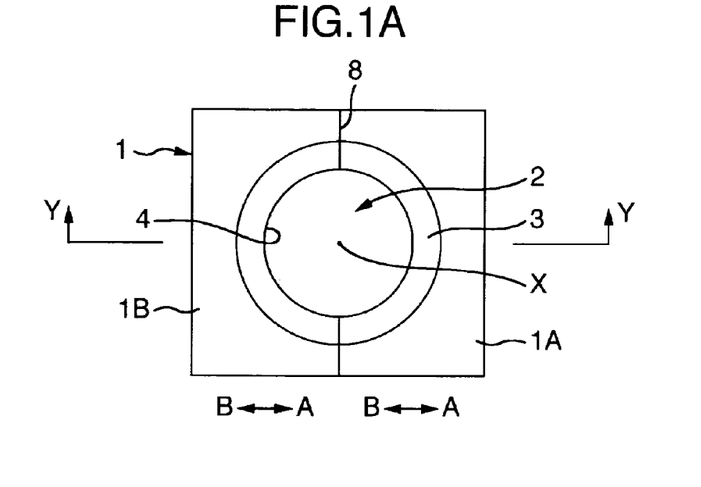
FIG. 1A A plan of an embodiment of a die for use in the present invention.

FIG. 1A through FIG. 6 show Embodiment 1, with FIG. 1A showing a plan of a die; FIG. 1B, a section along line Y-Y in FIG. 1A; FIG. 1C, a bottom view of the die; and FIG. 2 through FIG. 5, diagrams showing a process of producing a metal tubular member by using the die.

Figure 1B:
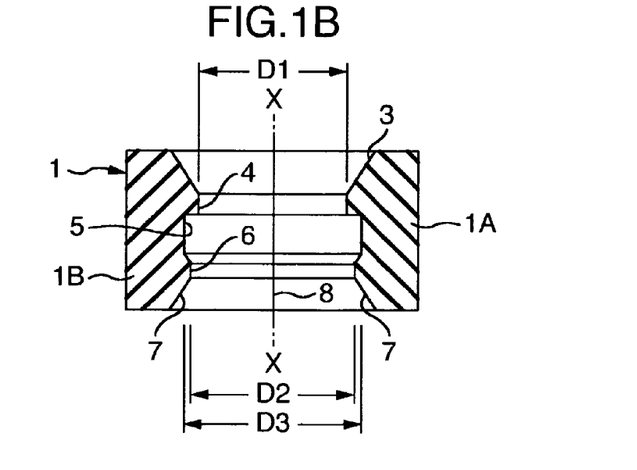
FIG. 1B A sectional view along line Y-Y in FIG. 1A.
Figure 1C:
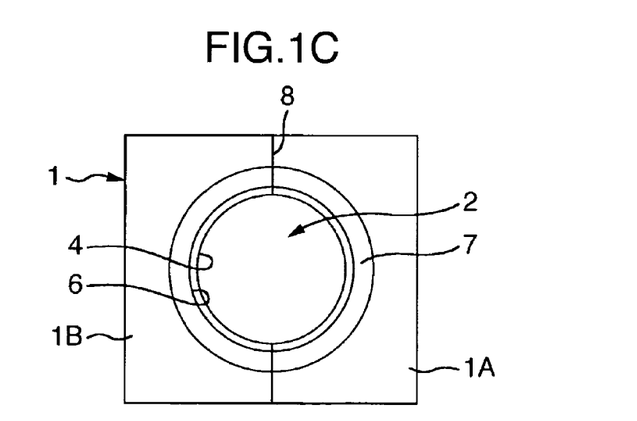
FIG. 1C A bottom view of the embodiment of the die in FIG. 1A.

Referring to FIG. 1A through FIG. 1C, a through hole 2 is formed in the central part of a die 1 in a penetrating manner, and on the circumferential face thereof, there are formed in order consecutively and coaxially with an axis X, from top in FIG. 1B, a first tapered section 3 in a funnel shape expanded in diameter toward top, a first contracted section 4 parallel to the axis X of the die, a holding section 5 parallel to the axis X of the die, a second contracted section 6 parallel to the axis X of the die, and a second tapered section 7 expanded in diameter toward bottom. Thus, these sections are disposed adjoining in the penetrating direction and coaxially.

Incidentally, though these first contracted section 4, holding section 5 and second contracted section 6 are consecutively, namely integrally formed in the direction of the axis X, the die 1 may be divided into a plurality of portions in its direction of the axis X and these sections 4 through 6 formed divisively. However, integral formation as shown in FIG. 1 is more desirable from the viewpoints of rigidity and superposing accuracy.

The die 1 is divided into a plurality of portions in a plane containing its axis X, namely in the circumferential direction around the axis X. In the illustrated embodiment, it is divided into two die forming bodies 1A and 1B. In FIG. 1, numeral 8 denotes the dividing part of the die 1. Further, both die forming bodies 1A and 1B are so disposed as to be moved in directions A and B in the illustration by driving means not shown; by moving the die forming body 1A in direction A in the illustration and the die forming body 1B in direction B, they are relatively separated from each other and opened, while by moving the die forming body 1A in direction B and moving the die forming body 1B in direction A, they are relatively brought close to each other and closed.

Incidentally, the die 1 may as well be radially divided into three or more portions, which can be moved to be opened or closed, and the means of driving the die may be one of any desired appropriate type.

The relationship among the minimum diameter of the first tapered section 3, namely the inside diameter D1 of the first contracted section 4, the minimum diameter of the second tapered section 7, namely the inside diameter D2 of the second contracted section 6, and the inside diameter D3 of the holding section 5 is set to D1<D2<D3.

Incidentally, where the thickness of the member to be machined is 1 mm in the embodiment to be described below, the difference between D2 and D1 including its two ends is set to between 2 mm and 1.6 mm.

Next, the metal tubular member to be produced will be described.

Figure 3:
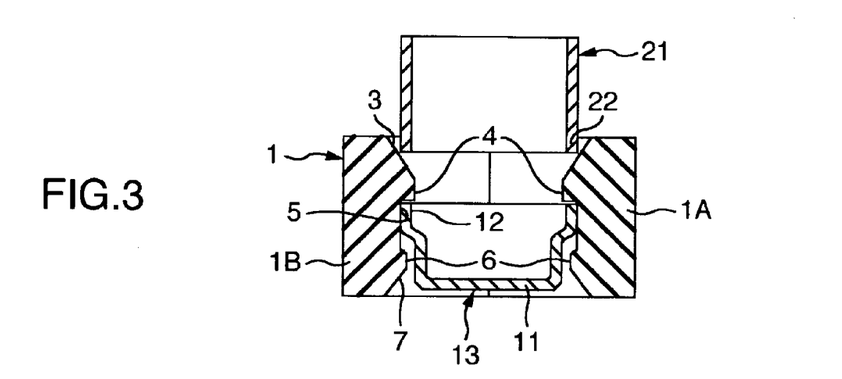
FIG. 3 A diagram showing the end plate farther inserted from the state of FIG. 2 and held by the die.
Figure 4:
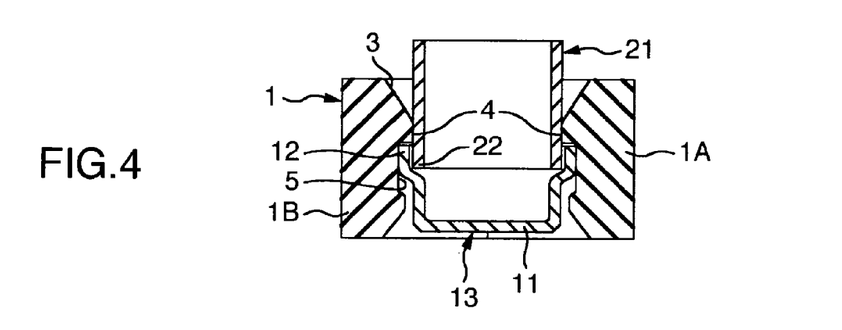
FIG. 4 A diagram showing a tubular body inserted into the die from the state of FIG. 3 and superposed over the end plate.
Figure 5:
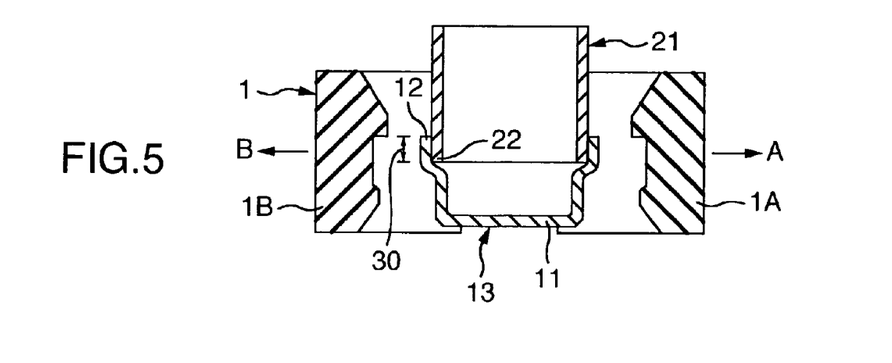
FIG. 5 A diagram showing the die released from the state of FIG. 4.

First, one tube forming body is prepared. The tube forming body used in this embodiment is a tubular body 21 of which both ends are open as shown in FIG. 3 through FIG. 5. The material and sheet thickness of this tubular body 21, for a muffler for instance, a common stainless steel material, such as SUS432T or SUS409 according to the Japanese Industrial Standard (JIS), of 1.0 to 1.2 mm in sheet thickness is used, but some other metal material of some other thickness may be used as well, and the sectional shape may be chosen as desired. In this Embodiment 1, this tubular body 21 serves as one tube forming body positioned inside.

Next, the other tube forming body is prepared. The tube forming body used in this embodiment is a bowl-shaped end plate 13 having a bottom 11 and an opened annular end section 12 comprising an annular flange as shown in FIG. 2 through FIG. 5. In this embodiment, the annular end section 12 is formed by disposing a stepped section 14 to expand the diameter by a step, but the annular end section 12 may as well be formed without forming this stepped section 14. Also, the end plate 13 is not limited to the bowl shape as described above, nor to a planar shape, but it is meant as a member to close the opposite tube forming body to be superposed on. The material and sheet thickness of this end plate 13 are the same as those of the tubular body 21, but some other metal material and sheet thickness are also acceptable.

The bowl-shaped end plate 13 may be formed by subjecting a flat metal sheet to such a known way of machining as pressing, spinning or the like, and it may have any cross-sectional shape, such as a true circle, oval, oblong circle, triangle, rectangle or some other polygon. The diameter and depth (length in the axial direction) can also be chosen as desired.

In this embodiment, this end plate 13 corresponds to the other tube forming body positioned outside.

Then, an open annular end section 22 of the tubular body 21 is fitted into the opened annular end section 12, formed of the annular flange of the end plate 13, and the superposed sections of these two are subjected to laser welding by scanning them from outside with a laser beam to produce a metal tubular member comprising the tubular body 21 and the end plate 13.

Next, the step of producing the metal tubular members referred to above will be described with reference to FIG. 2 through FIG. 6.

Figure 2:
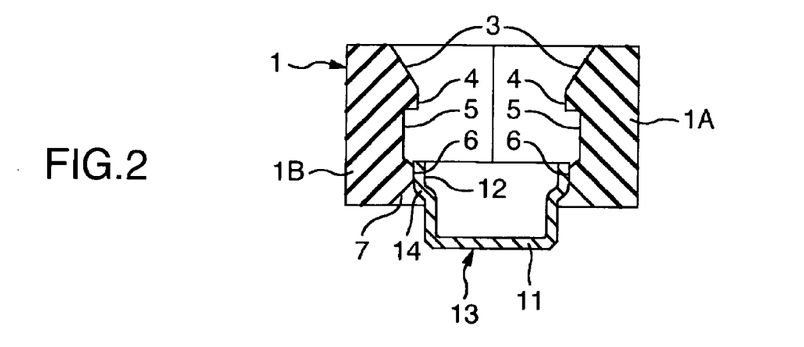
FIG. 2 A diagram showing a process of Embodiment 1 according to the invention, wherein an end plate is inserted into a die.

FIG. 2 shows a process of inserting, in a state in which the two forming bodies 1A and 1B of the die 1 are in a closed state, the annular end section 12 of the end plate 13 formed in a bowl shape as stated above from the second tapered section 7 side of the die 1 to the holding section 5, while using the tapered face of that second tapered section 7 as a press fitting guide, in which the annular end section 12 reaches the second contracted section 6 while being contracted in diameter by the second tapered section 7, and the extent of its diametral contraction is determined by the second contracted section 6. The annular end section 12 is thus contracted in diameter to some extent and its bore is modified to make it a true circle, either exactly or approximately. The extent of this diametral contraction of the annular end section 12 can be determined as desired, but it is sufficient to enable a release after the diametral contraction to give rise to a predetermined amount of springing back, as will be described afterwards.

In this embodiment, even if the outside diameter of the annular end section 12, which should be a true circle, is a non-true circular section of 100 mm in the minimum diameter portion and 102 mm in the maximum diameter portion before the insertion, this annular end section 12 is corrected to have a section of a true circle, either exactly or approximately (bore modification), as the annular end section 12 is passed through the second tapered section 7 and the second contracted section 6, and at the same time its outside diameter is contracted by about 1 mm. This diametral contraction by about 1 mm means that the real circumferential length of the annular end section 12 of a non-true circle before pressure fitting is converted into the diameter of a true circle, and the annular end section is contracted in diameter by about 1 mm with respect to the converted value. Thus, the minimum inside diameter of the second tapered section 7 (the inside diameter of the second contracted section 6) is set in advance to minus 1 mm relative to the converted value of the true-circle diameter in the annular end section 12.

When the annular end section 12 of the end plate 13 is contracted in diameter as described above, where the material, sheet thickness and bottom diameter of the annular end section 12 of the end plate 13 are as stated above, the diametral contraction by 1 mm gives rise to plastic deformation. However, if the tube forming bodies 1A and 1B of the die 1 are released in this diametrally contracted state (the state of FIG. 2), the annular end section 12 will be sprung back by about 0.4 mm in the extended direction of the diameter, so that the diameter is practically contracted by plastic deformation of about 0.6 mm.

Figure 6:
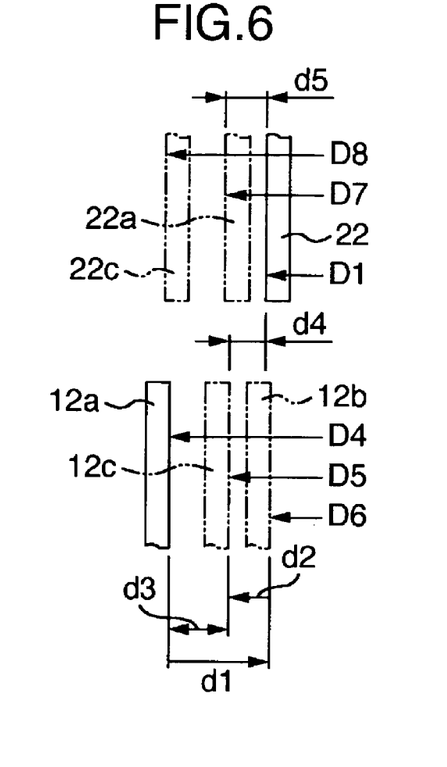
FIG. 6 A schematic diagram showing a state of being sprung back in Embodiment 1 of the invention.

Thus, the annular end section 12, with reference to FIG. 6, is contracted in diameter by an extent of d1 by the second tapered section 7 from a state 12a (inside diameter D4) before the diametral contraction represented by a solid line into a state (inside diameter D6) represented by a chain line 12b, and the subsequent arrival of the annular end section 12 at the holding section 5 of the die 1 causes the annular end section 12 to be sprung back from the diametrally contracted state 12b to expand the diameter by an extent of d2 by its own force, so as to return to a state (inside diameter D5) of a chain line 12c. The extent of diametral contraction in this state 12c from the state 12a before the diametral contraction is d3. And, when the die 1 is released, the annular end section 12 is slightly expanded in diameter from the chain line 12c by springing back, resulting in plastic deformation to an extent slightly less than d3 above.

While the spans of d1 to d3 and of d4 to d5 to be described afterwards are expressed as radius equivalents in FIG. 6, the extent of springing back, that of diametral contraction and that of diametral expansion are stated as diameter equivalents in the specification. Therefore, the extent of springing back, that of diametral contraction and that of diametral expansion in terms of diameter are treated as twice the pertinent expressions in the drawing.

Incidentally, in FIG. 2, the extent of diametral contraction of the annular end section 12 is insignificant relative to the whole size of the end plate 13, and the bottom 11 of the end plate 13 does not contract in diameter by its nature; however, this deformed state is difficult to illustrate in a drawing, and thus, the bottom 11 is illustrated in a diametrally contracted state with a view to making clear the deformed state only of the annular end section according to the invention. Also, in FIG. 3 through FIG. 5 below, the bottom 11 is also illustrated in a diametrally expanded state to match the diametral expansion of the annular end section 12.

FIG. 3 shows a state in which the end plate 13 is pressed into the die 1 farther than the state shown in FIG. 2 above, and that annular end section 12 is fitted into the holding section 5 of the die 1 with its diameter expanded, so as to have the end plate 13 held by the die 1.

The inside diameter D3 of the holding section 5 of the die 1 is set to about 0.4 mm plus the minimum diameter (the inside diameter of the second contracted section 6) of the second tapered section 7 to be substantially identical to the outside diameter of the annular end section 12 after the springing back by about 0.4 mm. However, since the annular end section 12 cannot be held if the outside diameter of the annular end section 12 when sprung back is equal to the inside diameter of the holding section 5, the inside diameter of the holding section 5 is set somewhat smaller than the outside diameter of the annular end section 12 after sprung back to enable the annular end section 12 to be held by the frictional force between the annular end section and the holding section 5.

In this way, the annular end section 12 of the end plate 13 is modified to its essentially correct sectional shape and outside diameter, set by the holding section 5 coaxially with the axis X of the die 1, namely on the same axis as the tubular member to be described afterwards, and awaits the next step.

Next, the tubular body 21 is inserted into the first tapered section 3 of the die 1 from the reverse side to the insertion of the end plate 13 as shown in FIG. 3.

In this embodiment, either the outside diameter D8 of the annular end section 22c of the tubular body 21 in the state before diametral contraction is the same as the inside diameter D4 of the annular end section 12a of the end plate 13 in the state before diametral contraction, or the outside diameter D8 of the annular end section 22c before the diametral contraction is set somewhat greater, preferably 0.2 mm greater than the inside diameter D4 of the annular end section 12a before the diametral contraction.

The annular end section 22 of this tubular body 21 is correctly modified in sectional shape and outside diameter by passing the first tapered section 3 and the first contracted section 4 as shown in FIG. 4, and afterwards the insertion is stopped when it has been superposed over the annular end section 12 set as described above.

At this time, in the same way as in the second tapered section 7 described above, in the first tapered section 3 (the first contracted section 4) the annular end section 22 of the tubular body 21 is contracted in diameter by 1 mm.

Incidentally, the annular end section 22 of the tubular body 21 is diametrally contracted by 1 mm by converting the diameter into that of a true circle in the similar manner as the annular end section 12 of the end plate 13 described above, and also sprung back by 0.4 mm. The deformed state of the tubular body 21 is also difficult to illustrate in a drawing like the annular end section described above, and, the illustration is made in a diametrally contracted way only to express the deformed state of the annular end section.

The state of the annular end section 22 of this tubular body 21 before diametral contraction is in the position of the chain line 22c in FIG. 6, and in the state in which the annular end section 22 has penetrated the minimum diameter portion of the first tapered section 3 (the first contracted section 4) and, with the minimum diameter of the first tapered section 3 (the inside diameter of the first contracted section 4) and the outside diameter of the annular end section 22 of the tubular body 21 being represented by D1 and the set inside diameter of the annular end section 12 by D5, a relationship of D1<D5 holds. Thus, a gap d4 is present between the outside diameter D1 of the annular end section 22 and the inside diameter D5 of the annular end section 12 on one side in the diametral direction as shown in FIG. 6. Each portion is so set that twice this gap d4 (the gap in terms of diameter) is 0 mm≦(d4×2) ≦0.4 mm, namely 0 mm≦(D5−D1)≦0.4 mm, without fail.

Since the gap d4 is present between the annular end section 22 and the annular end section 12 in this way, the annular end section 22 of the tubular body 21 can be loosely inserted into the annular end section 12 of the end plate 13. Since both these sections 12 and 22 have been corrected in sectional shape and diameter, they do not interfere with each other in this insertion, which is therefore reliably accomplished.

Incidentally, though the sheet thicknesses of the annular end section 12 and of the annular end section 22 in FIG. 6 are greater than the extents of diametral contraction and of diametral expansion, they are schematically illustrated to facilitate understanding.

Though not shown, in order to keep the length of superposed sections 30 (lap length) constant all around the circumference of the superposed sections, a bead protruding in the radial direction may be formed in advance in at least one position on the circumference of one tube forming body away by a desired lap length from the sheet thickness end face of the annular end section of that tube forming body, and then the sheet thickness end face of the annular end section of the other tube forming body may be inserted until it comes into contact with the bead. For instance, beads having a circular section and protruding in the radial direction (outward) may be formed in advance in four positions on the circumference of the tube forming body 21 away by the desired lap length from the sheet thickness end face of the annular end section 22 of the tube forming body 21, and then, the sheet thickness end face of the annular end section 12 of the end plate 13 may be inserted until it comes into contact with the bead. However, in order to avoid interference with the bead at the time of insertion, a concave groove in the lengthwise direction has to be cut in the die, the tight fit of the superposed sections may somewhat deteriorate in the position of that concave groove, and therefore due consideration should be given to the position and shape of the bead.

Next, the forming body 1A of the die 1 is moved in direction A and the forming body 1B is moved in direction B to separate (release) them from each other as shown in FIG. 5, the annular end section 22 of the tubular body 21 is sprung back to be expanded as indicated by the chain line 22a in FIG. 6, and the outside diameter of that annular end section 22 tends to expand from the outside diameter D1 to D7 as shown in FIG. 6. Twice this diametral expansion extent d5 (the diametral expansion extent in terms of diameter) is about 0.4 mm, and D5≦D7 holds. Therefore, as twice the gap d4 (gap in terms of diameter) mentioned above is set not to exceed 0.4 mm (d4≦d5), the external face of the annular end section 22 of the tubular body 21 comes into tight contact with the internal face of the annular end section 12 to form gap-free superposed sections 30.

Strictly speaking, the release of the die 1 also slightly expands the diameter of the annular end section 12 by the springing back, but the extent of that springing back is set small enough relative to 0.4 mm so that the springing back of the annular end section 22 of the tubular body 21 brings this annular end section 22 into tight contact with the annular end section 12.

Whereas the relative separation (release) of the two forming bodies 1A and 1B of the die 1 causes the integrally linked tubular body 21 and end plate 13 to fall downward in the illustration of FIG. 5, it is advisable to hold one of them in advance with a device not shown. For instance, it would be efficient to have it held with a robot arm and conveyed to the welding step, which is the next step.

Next, the integrated tubular body 21 and end plate 13 are conveyed to the welding step, and the gap-free superposed sections in fully tight contact are securely joined by laser welding, fillet welding by arc welding or otherwise, or lap welding to finish the desired metal tubular members.

Embodiment 2

Figure 7:
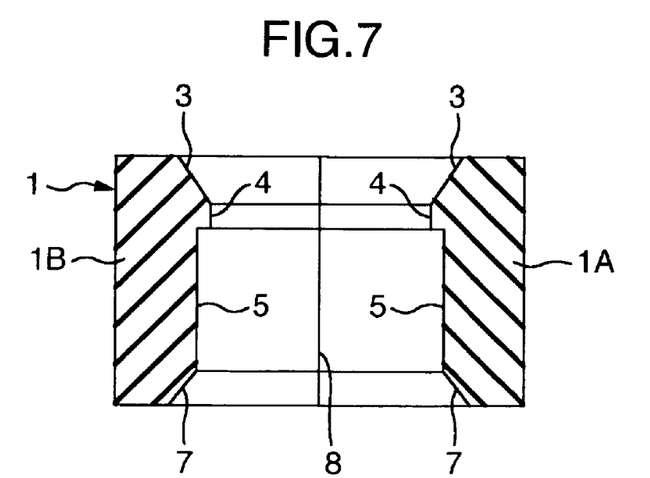
FIG. 7 A sectional view showing an example of deformation of a die in Embodiment 2 according to the invention.

FIG. 7 shows Embodiment 2.

Although the second contracted section 6 is formed in the die 1 in Embodiment 1 described above, the holding section 5 may as well be formed as being extended to the second tapered section 7, without forming the second contracted section 6, as shown in FIG. 7.

As other structures of the die 1 shown in this FIG. 7 are the same as their respective counterparts in Embodiment 1 described above, the same parts as in Embodiment 1 are assigned respectively the same reference signs, and their description will be dispensed with.

In this Embodiment 2, the end plate 13 of the annular end section 12 is directly pressed in from the second tapered section 7 side to the holding section 5 as in Embodiment 1 described above, and execution of similar steps to the corresponding ones in Embodiment 1 can achieve similar actions and effects to the foregoing.

Further, in the die 1 in this Embodiment 2, while the end plate 13 which is the other tube forming body may be held by the holding section 5 of the die 1 or held by a robot as described with reference to Embodiment 1, advisably an end plate receptacle 40 may be disposed as will be shown in the next Embodiment 3 and the end plate may be held by this end plate receptacle 40.

Embodiment 3

Figure 8:
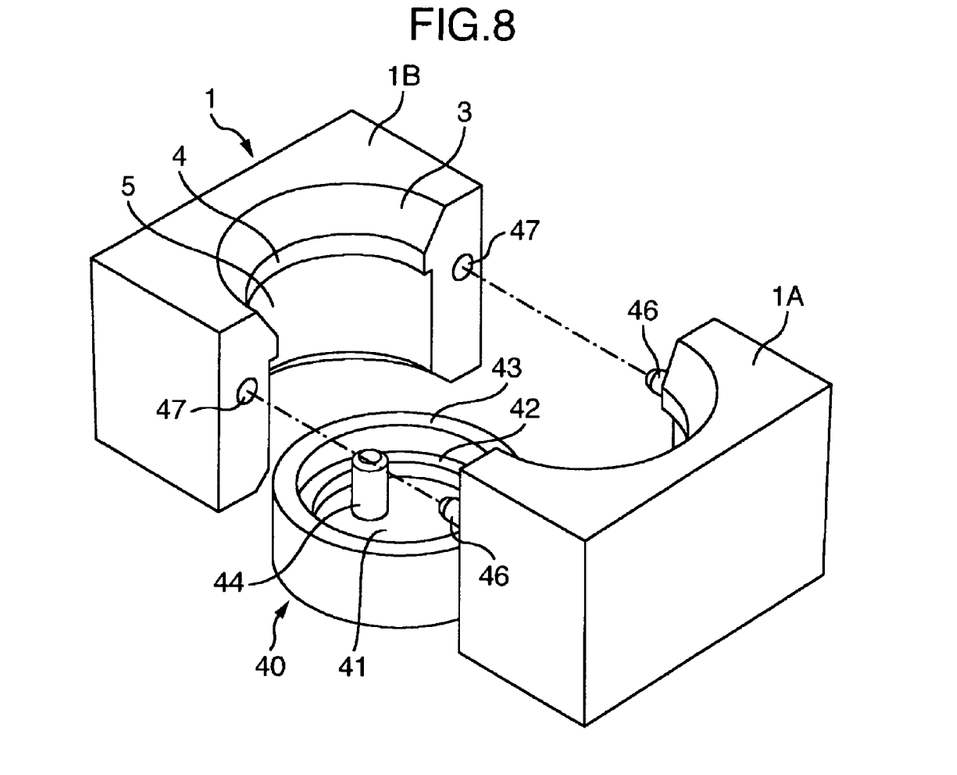
FIG. 8 A perspective view of a die in Embodiment 3 according to the invention.
Figure 9:
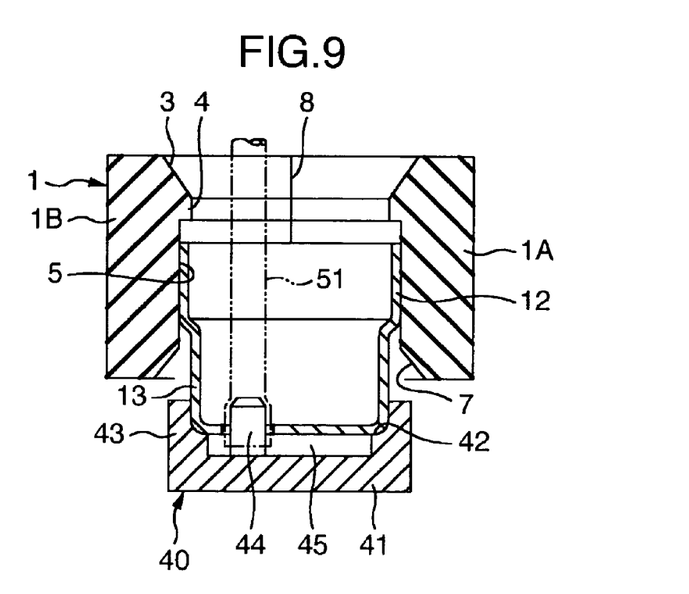
FIG. 9 A sectional view of FIG. 8.

FIG. 8 and FIG. 9 show Embodiment 3.

The die 1 is structured similarly to that in Embodiment 2, and the same parts as in the foregoing are assigned respectively the same reference signs, with their description dispensed with.

Further, an end plate receptacle 40 is disposed underneath the die 1, and the end plate receptacle 40 is raised and lowered by an elevating device not shown. The end plate receptacle 40 comprises a bottom plate 41, a receiving face 42 protuberating stepwise on the outer circumference of the bottom plate 41 and a circumferential wall 43 further protuberating on the outer circumference of the receiving face 42, and is formed in a saucer shape whose top side is open.

Further, the receiving face 42 is so formed as to have an adequate diameter for bearing an outer circumstance of the bottom face of the end plate 13, and the inner circumferential face of the circumferential wall 43 is so formed as to bear an outer circumferential face lower than the annular end section 12 of the end plate 13. Further, the inner faces of these receiving face 42 and circumferential wall 43 are formed coaxially with the end plate 13 and the die 1.

Further, a positioning pin 44 is provided uprightly on the inner face of the bottom plate 41 in the end plate receptacle 40.

Figure 14A:
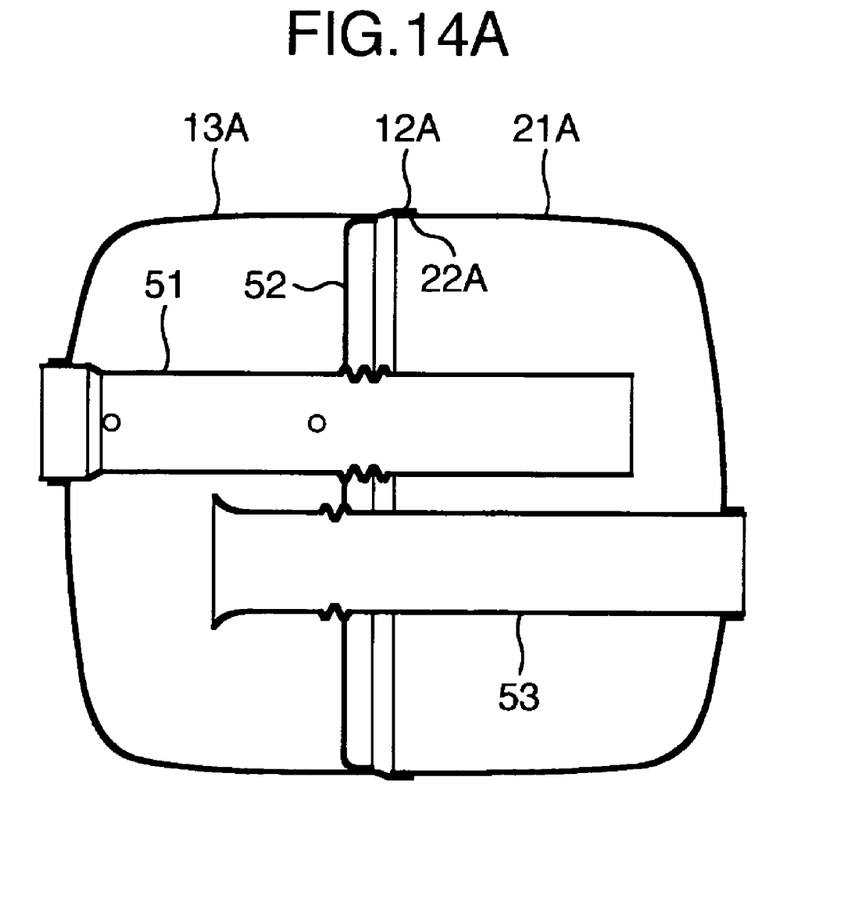
FIG. 14A A sectional view of a muffler showing Embodiment 9 in which the invention is applied in the production of the muffler.

The positioning pin 44, where an end plate (tube forming body 13A) in a muffler shown in FIG. 14A to be referred to afterwards is to be set on the end plate receptacle 40 for instance, positions the end plate 13 in the circumferential direction by causing the positioning pin 44 to be fitted into the hollow part of its pipe 51. Further, as the outer end of the pipe 51 protrudes below the end plate 13, a concave 45 is formed in the top face of the bottom plate 41 of the end plate receptacle 40 so that this protruding portion does not interfere with the end plate receptacle 40.

In this Embodiment 3, the end plate 13 is borne by the end plate receptacle 40 as shown in FIG. 9, and the up-and-down movements of the end plate receptacle 40 cause the end plate 13 to be inserted into the die 1 and to be disengaged from the die 1.

In this Embodiment 3, too, similar steps to the corresponding ones in Embodiment 1 can achieve similar actions and effects to the foregoing.

Incidentally in this Embodiment 3, as shown in FIG. 8, an engaging pin 46 is protrusively disposed on one of the mutual joining faces of one die forming body 1A and the other die forming body 1B, and an engaging hole 47 into which the engaging pin 46 is to be fitted is bored in the other; when the two die forming bodies 1A and 1B are joined together, the engaging pin 46 fits into the engaging hole 47 to make the two die forming bodies 1A and 1B coaxial.

These engaging pin 46 and engaging hole 47 are also provided in the dies 1 of Embodiment 1 and 2 described above.

Embodiment 4

Figure 10:
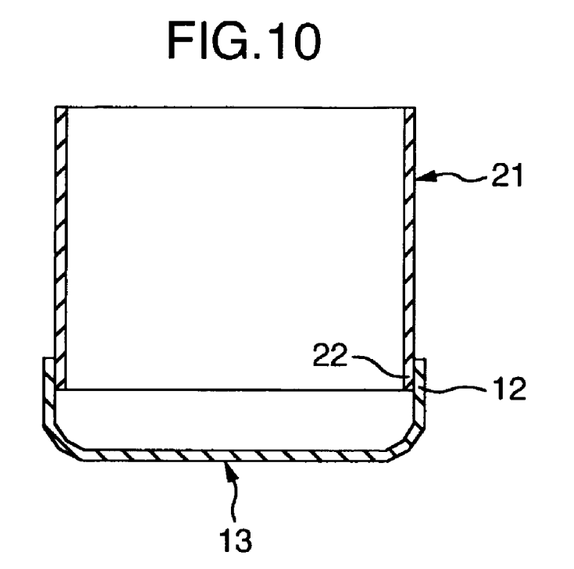
FIG. 10 A sectional view of a tubular member showing Embodiment 4 according to the invention.

FIG. 10 shows Embodiment 4.

In this Embodiment 4, the annular end section 12 of the end plate 13 and the annular end section 22 of the tubular body 21 are superposed without forming the stepped section 14 mentioned above in either the tubular body 21 which is the one tube forming body mentioned above or the end plate 13 which is the other tube forming body.

In this Embodiment 4, too, similar die structure and steps to their counterparts in Embodiment 1 described above enable superposed sections similarly in tight contact to the foregoing to be formed.

Embodiment 5

Figure 11:
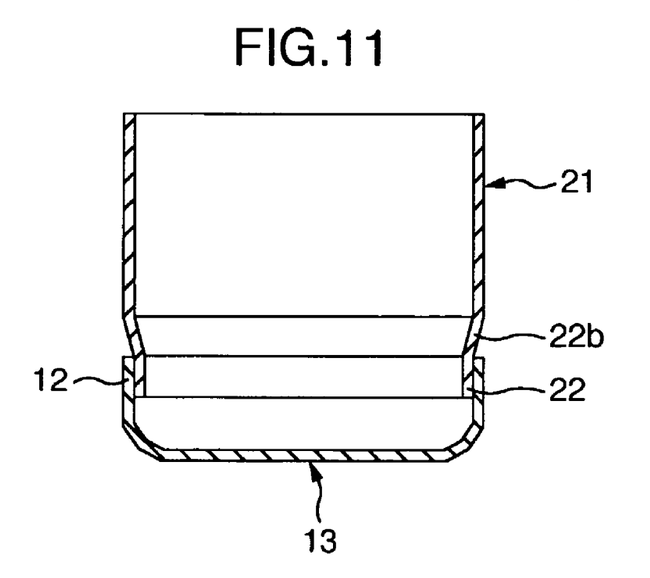
FIG. 11 A sectional view of a tubular member showing Embodiment 5 according to the invention.

FIG. 11 shows Embodiment 5.

In this Embodiment 5, a small-diameter stepped section 22b is formed on the annular end section 22 of the tubular body 21 without forming the stepped section 14 on the end plate 13, and the annular end section 12 of the end plate 13 and the annular end section 22 of the tubular body 21 are superposed.

In this Embodiment 5, too, similar die structure and steps to their counterparts in Embodiment 1 described above enable superposed sections similarly in tight contact to the foregoing to be formed.

Embodiment 6

Figure 12:
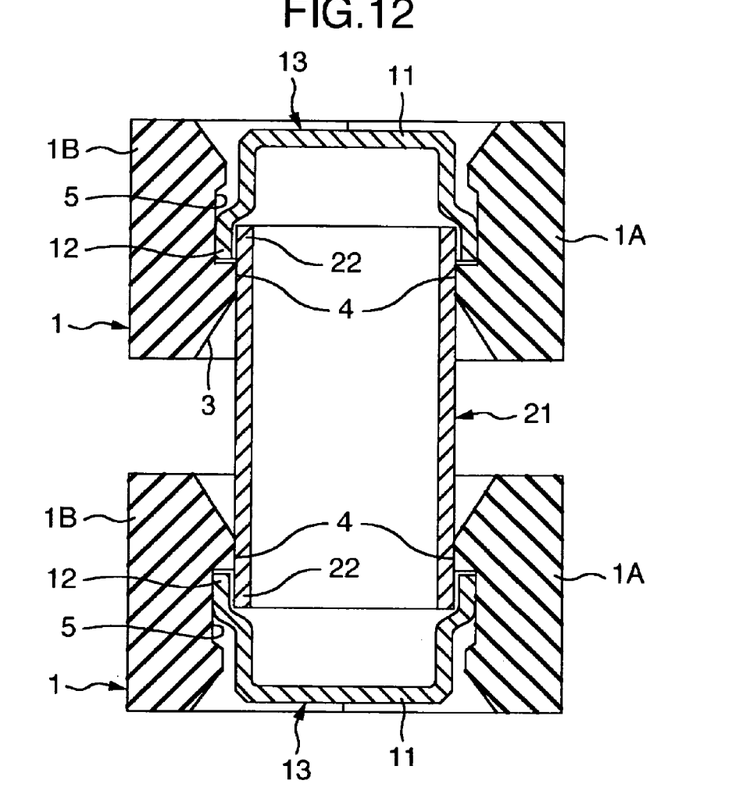
FIG. 12 A diagram showing part of a process of producing a tubular member in Embodiment 6 according to the invention.

FIG. 12 shows Embodiment 6.

In this Embodiment 6, the annular end sections 12, 12 of the end plates 13, 13 on which stepped sections 14 are formed are fitted from outside to both annular end sections 22 of the tubular body 21 on which no stepped section is formed, and they are superposed.

In this Embodiment 6, too, similar die structure and steps to their counterparts in Embodiment 1 described above enable superposed sections similarly in tight contact to the foregoing to be formed.

In this Embodiment 6, as shown in FIG. 12, two dies 1 similar to the foregoing are arranged coaxially with the tubular body 21 and the end plate 13 and in such a way that the first tapered sections 3 oppose each other.

And, one superposing section may first be formed of one of the dies 1 by the same process as for Embodiment 1, and then, the other superposed section formed of the other die 1, or both superposed sections may as well be formed at the same time.

In the former case, first, after first forming one superposed section of the tubular body 21 and the end plate 13 with one (for instance, the lower one in FIG. 12) of the dies 1 in the same process as for Embodiment 1, the end plate 13 may be set on the other (for instance, the upper one in FIG. 12) of the dies 1; after that, the semi-finished product superposed with the one die 1, kept in a state of being held by the one die, may be brought closer to the other die 1 to form the other superposed section of the tubular body 21 and the end plate 13 by the process for Embodiment 1 described above.

Or, in the latter case, the end plate 13 may as well be set on each of the two dies 1 in advance, and the dies 1 in which these end plates 13 are set may be brought closer to the two annular end sections 22 of the tubular body 21, to form both superposed sections at the same time.

Both dies 1 may as well be brought closer to or separated from each other in the axial direction of the tubular body 21 and the end plate 13 by driving means not shown.

Embodiment 7

Figure 13:
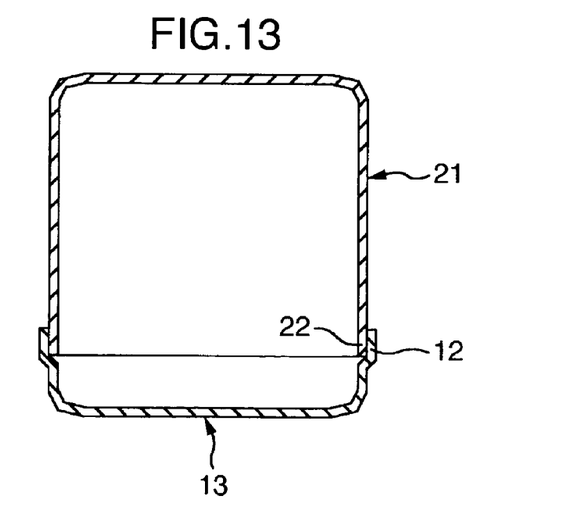
FIG. 13 A sectional view of a tubular member showing Embodiment 7 according to the invention.

FIG. 13 shows Embodiment 7.

In this Embodiment 7, the counterpart to the tubular body 21 in Embodiment 1 described above is a bottomed tubular body deep-drawn (pressed) from a planar material into a bowl shape, whose open annular end section 22 is superposed over the annular end section 12 of the end plate 13.

In Embodiment 7, too, similar die structure and steps to their counterparts in Embodiment 1 described above enable superposed sections similarly in tight contact to the foregoing to be formed.

Embodiment 8

Each of the foregoing embodiments is a case in which the annular end section 12 of the end plate 13 which is the other tube forming body is externally fitted onto the annular end section 22 of the tubular body 21 which is the other tube forming body, but in any of these embodiments, the annular end section 22 of the tubular body 21 may as well be externally fitted onto the annular end section 12 of the end plate 13. Thus, the tubular body 21 may be used as the externally positioned other tube forming body and the end plate 13, as the internally positioned one tube forming body. Incidentally, this Embodiment 8 is not illustrated.

This arrangement can be accomplished by inserting the annular end section 22 of the tubular body 21 from the second tapered section 7 side in the die 1 and inserting the annular end section 12 of the end plate 13 from the first tapered section 3 side in the die 1.

Embodiment 9

Figure 14B:
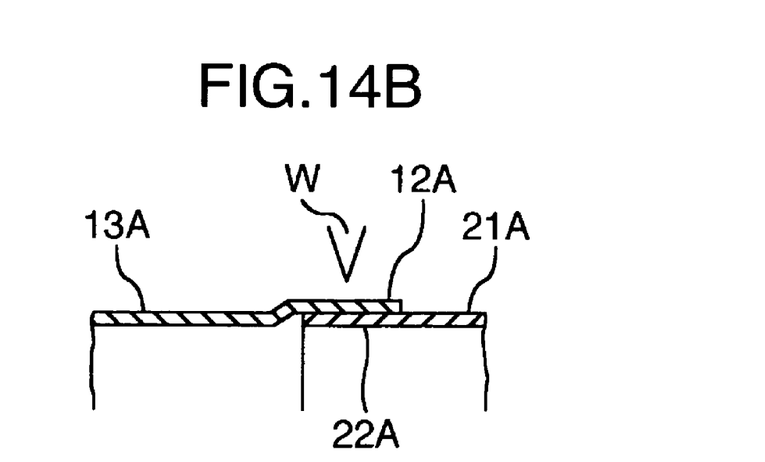
FIG. 14B An enlarged sectional view showing superposed sections of the muffler of FIG. 14A.

FIG. 14A and FIG. 14B show Embodiment 9 representing the application of the invention to a method of producing the external shell (external cylinder) of a muffler to be connected to the exhaust line of an internal combustion engine.

Thus, two bottomed tube forming bodies 13A and 21A deep-draw pressed from metal sheets into a bowl shape are used, and the annular end section 12A is formed on the other tube forming body 13A. This other tube forming body 13A corresponds to the end plate 13 in Embodiment 1 described above and its annular end section 12A to the annular end section 12, while one tube forming body 21A corresponds to the tubular body 21 in Embodiment 1 and an annular end section 22A to the annular end section 22.

And, the other tube forming body 13A is provided with built-in elements including an inlet pipe 51, a porous partition wall 52 and an outlet pipe 53, the annular end section 12A in that other tube forming body 13A is inserted as described above from the second tapered section 7 in the die 1, after that the annular end section 22A of the one tube forming body 21A is inserted as described above from the first tapered section 3 in the die 1, and these annular end section 12A and annular end section 22A are superposed as described above. Incidentally, the porous partition wall 52 is fixed to the tube forming body 13A by spot welding.

And, these annular superposed sections are joined by welding W using a laser beam or the like.

The fitting method, namely the production method, according to the invention is particularly effective for such an external cylinder (tube forming body) by reason of its small sheet thickness.

Embodiment 10

Figure 15:
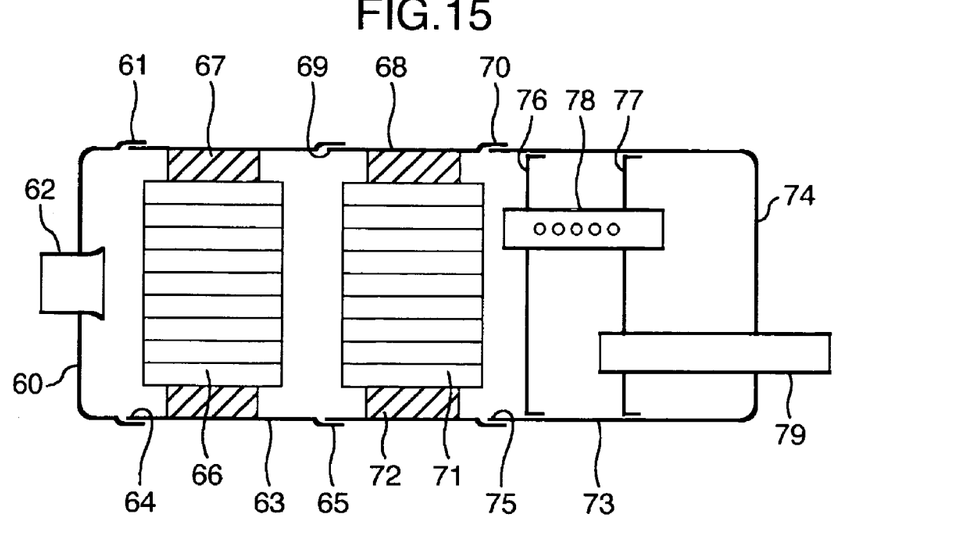
FIG. 15 A sectional view showing an example of application of the invention to an exhaust gas purifying device in Embodiment 10.

FIG. 15 shows Embodiment 10.

This Embodiment 10 is an embodiment of the invention to be applied to the production of the external shell of an exhaust gas purifying device for use in a motor vehicle or the like and to the production of the external shell of a muffler linked to the exhaust gas purifying device.

This structure shown in FIG. 15 comprises an end plate 60 which is a first tube forming body constituting an annular end section 61 similar to the annular end section 12 described above and provided with an exhaust suction pipe 62, a second tube forming body 63 whose annular end section 64 is internally fitted into the annular end section 61 of the end plate 60, a third tube forming body 68 whose annular end section 69 is internally fitted into the annular end section 65 of the second tube forming body 63, and a bowl-shaped fourth forming body 73 whose annular end section 75 is internally fitted into the annular end section 70 of the third tube forming body 68 and whose other end has a bottom plate 74 formed thereon.

Also, within the second tube forming body 63, a catalyst carrier 66 which is a built-in element is internally disposed via a holding member 67. Further, within the third tube forming body 68, a catalyst carrier 71 which is a built-in element is internally disposed via a holding member 72. Further, within the fourth tube forming body 73, built-in elements comprising partition walls 76 and 77, an inlet pipe 78 and an outlet pipe 79 are disposed in a fixed state. The partition walls 76 and 77 are fixed to the fourth tube forming body 73 by spot welding.

And, the method of producing tubular members which constitute the external shell in this Embodiment 10 is to superpose the annular end section 64 of the second tube forming body 63 in which built-in elements including the catalyst carrier 66 are internally disposed via the holding member 67 over the annular end section 61 of the end plate 60 appended with the exhaust suction pipe 62 by the superposing process according to the invention, then to superpose the annular end section 69 of the third tube forming body 68 in which built-in elements including the catalyst carrier 71 are internally disposed via the holding member 72 over the annular end section 65 of the second tube forming body 63 by the superposing process according to the invention, next to superpose the annular end section 75 of the fourth tube forming body 73 in which built-in elements including the partition wall 76 are disposed in a fixed state over the annular end section 70 of the third tube forming body 68 by the superposing process according to the invention, and after that these superposed sections are welded as described above.

Embodiment 11

For this Embodiment 11, though not shown, the invention may be applied to the production of the external shell of the exhaust gas purifying device having a built-in diesel particulate filter (DPE) in place of a catalyst carrier in the second and third tube forming bodies 63 and 68 in Embodiment 10, and further the invention may be applied to the production of the external shell (external cylinder) of an EGR (exhaust gas recirculation) system or the external shell (external cylinder) of a heat exchanger or the like.

Embodiment 12

Figure 16:
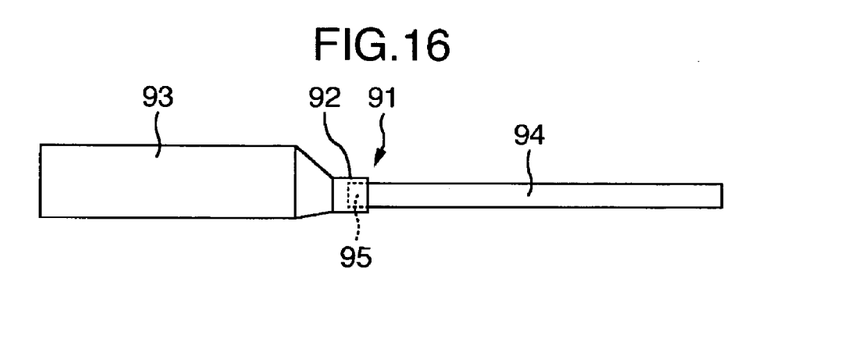
FIG. 16 A profile showing an example of application of the invention to an instrument panel reinforcement in Embodiment 12.

FIG. 16 shows Embodiment 12.

This Embodiment 12 is a case of application to the production of a metal-built instrument panel reinforcement for motor vehicles.

This instrument panel reinforcement 91 shown in FIG. 16 comprises the other tube forming body 93 having an annular end section 92 formed by subjecting one opening of a large-diameter pipe each of whose ends is open to eccentric diametral contraction and one tube forming body 94 formed of a pipe whose outside diameter is appropriate to be fitted into the annular end section 92 and both ends of which are open; the annular end section 95 of the one tube forming body 94 is superposed into the annular end section 92 of the other tube forming body 93 in a state of tight contact, and these superposed sections are joined by laser welding or some other way of welding.

In the fitting of the two annular end sections 92 and 95 in the production of this instrument panel reinforcement 91, too, tight superposing can be achieved by the above-described process according to the invention, and these superposed sections can be satisfactorily joined by laser welding.

The invention can be extensively applied to such structural members of motor vehicles.

Embodiment 13

Figure 17:
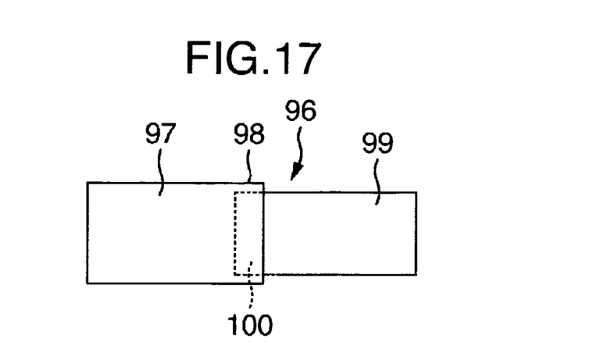
FIG. 17 A profile showing an example of application of the invention to a pipe in Embodiment 13.

FIG. 17 shows Embodiment 13.

This Embodiment 13 is a case of application of the invention to the production of a common tubular member configured by fitting usual metal pipes each open at both ends which are open and their superposed sections are welded together.

In such a tubular member 96 as well, the annular end section 100 of its one tube forming body 99 can be fitted into the annular end section 98 of the other tube forming body 97 by the above-described process according to the invention, and their superposed sections can be joined by laser welding.

Other Embodiments

In the fourth through 13th embodiments, too, the die 1 shown in FIG. 1 may be used, the die 1 shown in FIG. 7 may be used, and further the end plate receptacle 40 shown in FIG. 8 and FIG. 9 may be used.

Furthermore, the invention can be applied to the automotive parts mentioned above but also extensively to the production of all fit-in items.

Furthermore, the embodiments described above, for instance the embodiments shown in FIG. 2 through FIG. 6 and FIG. 10 through FIG. 14, are cases in which springing back in the plastic deformation regions of the annular end sections 22 and 22A of the tubular bodies (tube forming bodies) 21 and 21A is utilized to bring the annular end sections 22 and 22A of the tubular bodies 21 and 21A and the annular end sections 12 and 12A of the end plates (tube forming bodies) 13 and 13A into tight contact, and it is also conceivable to return, after deforming the annular end sections 22 and 22A of the tubular bodies 21 and 21A by diametral contraction in an elastic deformation region in which they can return to their original shapes and fitting them into the annular end sections 12 and 12A of the end plates 13 and 13A, the sections into their original shapes by utilizing their elastic restorability to superpose the annular end sections 22 and 22A of the end plates 13 and 13A in tight contact.

Further, neither bore modification of the annular end sections 12 and 12A of the end plates 13 and 13A nor a device for that purpose is absolutely necessary.

Thus, if the end plate 13 is held by separate means and the cross-sectional shape and diameter of the annular end section 12 are accurate enough to require no correction in Embodiment 1 described above, the second tapered section 7 and the second contracted section 6 of the die 1 are dispensable.

Also in this case, when the two forming bodies 1A and 1B of the released die 1 relatively come closer to each other in a state in which the end plate 13 is held in a prescribed position relative to the die 1, the annular end section 12 may be grasped by its holding sections 5 and 5.

In an actual process, however, it is desirable for products of plastic machining of thin sheets to be corrected in shape and diameter, the holding of end plates to be accomplished with a die, and with a view to ensuring insertion by securing the coaxial disposition of the annular end sections of end plates and of the annular end sections of tubular bodies, it is preferable for the die 1 to be equipped with the second tapered section 7 and the second contracted section 6 as in the foregoing embodiments.

The invention claimed is:

1. A method of producing a metal tubular member, said metal tubular member having two or more tube forming bodies and mutually superposed sections between the tube forming bodies in at least one position, comprising:

integrally joining by welding one open annular end section of one of said tube forming bodies positioned inside the superposed sections and the other open annular end section of the other of said tube forming bodies positioned outside, wherein said other annular end section reaches a holding section within a die after passing through a tapered section provided in the die on an insertion side thereof and undergoing machining for diametral contraction, and is held by the holding section;

inserting said one annular end section, in a state of being so pressurized by said die as to make an outside diameter thereof smaller than an inside diameter of said other annular end section having undergone machining for diametral contraction, into said other annular end section; and releasing said other annular end section outside from the pressurizing force by being released from said die while said one annular end section inside is released from said pressurizing force, to cause said one annular end section inside to be brought by springing back thereof into tight contact with the inside face of said other annular end section outside.

2. The method of producing a metal tubular member as claimed in claim 1, wherein a difference between the inside diameter of said other annular end section and the outside diameter of said one annular end section at the time of insertion is not greater than an extent of springing back to expand the diameter of said one annular end section by the separation of said die.

3. The method of producing a metal tubular member as claimed in claim 1, wherein built-in elements are arranged in at least one of said tube forming bodies.

4. The method of producing a metal tubular member as claimed in claim 1, wherein at least one of said tube forming bodies is made an end plate and at least one thereof is made a tubular body.

5. The method of producing a metal tubular member as claimed in claim 1, wherein two of said tube forming bodies are provided and these two tube forming bodies are formed in a bowl shape.

6. The method of producing a metal tubular member as claimed in claim 1, wherein said die has said holding section and tapered section adjacent in a penetrating direction of members and coaxially, and is formed to be radially divisible and separable with respect to an axis thereof.

7. The method of producing a metal tubular member as claimed in claim 1, wherein said welding is accomplished by laser beam welding.

8. The method of producing a metal tubular member as claimed in claim 1, wherein said metal tubular member constitutes the external shell of a muffler.

9. The method of producing a metal tubular member as claimed in claim 1, wherein said metal tubular member constitutes the external shell of an exhaust gas purifying device.

10. The method of producing a metal tubular member as claimed in claim 1, wherein said metal tubular member constitutes an instrument panel reinforcement for use in motor vehicles.

* * * * *